US009185175B1

(12) United States Patent
Sharma et al.

(10) Patent No.: US 9,185,175 B1
(45) Date of Patent: Nov. 10, 2015

(54) SYSTEM AND METHOD FOR OPTIMIZING VISUAL SESSION RECORDING FOR USER ACCOUNT MANAGEMENT IN A COMPUTING ENVIRONMENT

(71) Applicant: Oracle International Corporation, Redwood Shores, CA (US)

(72) Inventors: Himanshu Sharma, Redwood Shores, CA (US); Sudhir Kumar Srinivasan, San Jose, CA (US); Ramaprakash Sathyanarayan, Redwood Shores, CA (US); Arun Theebaprakasam, Fremont, CA (US); Buddhika Nandana Kottahachchi, San Mateo, CA (US); Olaf Stullich, Morgan Hill, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/494,728

(22) Filed: Sep. 24, 2014

(51) Int. Cl.
G06F 15/16 (2006.01)
H04L 29/08 (2006.01)
H04L 12/26 (2006.01)

(52) U.S. Cl.
CPC ............... H04L 67/22 (2013.01); H04L 43/10 (2013.01); H04L 67/306 (2013.01); H04L 43/045 (2013.01)

(58) Field of Classification Search
CPC ....... H04L 67/22; H04L 67/306; H04L 43/10; H04L 43/045
See application file for complete search history.

(56) References Cited

U.S. PATENT DOCUMENTS

| 5,852,436 | A | 12/1998 | Franklin et al. | |
|---|---|---|---|---|
| 7,613,290 | B2 | 11/2009 | Williams et al. | |
| 7,620,895 | B2 | 11/2009 | Adkins et al. | |
| 7,627,821 | B2 | 12/2009 | Klementiev | |
| 7,673,340 | B1 | 3/2010 | Cohen et al. | |
| 2002/0038388 | A1 | 3/2002 | Netter | |
| 2002/0106190 | A1* | 8/2002 | Nygren et al. | 386/68 |
| 2005/0216527 | A1 | 9/2005 | Erlingsson | |
| 2007/0083821 | A1* | 4/2007 | Garbow et al. | 715/781 |
| 2007/0101353 | A1* | 5/2007 | Jeong et al. | 725/13 |
| 2007/0124476 | A1 | 5/2007 | Oesterreicher et al. | |
| 2007/0130292 | A1 | 6/2007 | Tzruya et al. | |
| 2007/0136235 | A1 | 6/2007 | Hess | |
| 2007/0191966 | A1* | 8/2007 | Fisher et al. | 700/1 |
| 2007/0300161 | A1 | 12/2007 | Bhatia et al. | |
| 2007/0300179 | A1 | 12/2007 | Friedlander | |
| 2008/0084470 | A1 | 4/2008 | Hamilton | |

(Continued)

OTHER PUBLICATIONS

© Stepok Image Lab. 2007-2013, Screen Anytime v4.5 Administrator Manual, Document version v4.5, Jun. 20, 2013, 25 pages.

(Continued)

Primary Examiner — Dhairya A Patel
(74) Attorney, Agent, or Firm — Tucker Ellis LLP

(57) ABSTRACT

A system and method can monitor one or more user sessions on a target system in a computing environment. An account managing system can capture a plurality of user session screen captures that are associated with said one or more user sessions on the target system. Furthermore, the account managing system can compare a user session screen capture, which is captured at a time during said one or more user sessions, with one or more user session screen captures that are recorded before the time. Then, the account managing system can record said user session screen capture if the target system is determined to be active at the time when said user session screen capture is captured.

28 Claims, 6 Drawing Sheets

(56) References Cited

U.S. PATENT DOCUMENTS

| | | | |
|---|---|---|---|
| 2008/0098101 | A1 | 4/2008 | Black et al. |
| 2008/0222532 | A1* | 9/2008 | Mester et al. ............... 715/738 |
| 2009/0254960 | A1 | 10/2009 | Yarom et al. |
| 2011/0023115 | A1 | 1/2011 | Wright |
| 2011/0184982 | A1* | 7/2011 | Adamousky et al. ......... 707/776 |
| 2011/0276685 | A1 | 11/2011 | de Waal et al. |
| 2011/0288931 | A1* | 11/2011 | Kuhn et al. ............... 705/14.49 |
| 2011/0296001 | A1* | 12/2011 | Ramstrom .................... 709/224 |
| 2012/0131456 | A1 | 5/2012 | Lin et al. |
| 2012/0159324 | A1 | 6/2012 | Chavez et al. |
| 2013/0083843 | A1 | 4/2013 | Bennett |
| 2013/0083923 | A1 | 4/2013 | Soo et al. |
| 2013/0097626 | A1 | 4/2013 | Rajagopal et al. |
| 2013/0332987 | A1 | 12/2013 | Tenneti |
| 2014/0057238 | A1* | 2/2014 | Okamoto et al. ............ 434/308 |
| 2014/0149496 | A1 | 5/2014 | Lee et al. |

OTHER PUBLICATIONS

Recordts Installation Guide version 2.0, TSFactory LLC. © 2005-2010, updated May 1, 2010, 21 pages.

Softactivity TS Monitor 3.5—software for Windows Terminal Server monitoring, © 2000-2014, Deep Software Inc., retrieved from: <http://www.softactivity.com/tsm.aspx>, Aug. 20, 2014, 5 pages.

Censornet Desktop Surveillance from © 2005-2013 Censornet Ltd. retrieved from: <http://www.censornet.com/en/products/desktopsurveillance>, Aug. 20, 2014, 2 pages.

Censornet Desktop Surveillance Product Features of Desktop Surveillance from © 2005-2013 Censornet Ltd., retrieved from: <http://www.censornet.com/en/products/desktopsurveillance/features>, Aug. 20, 2014, 1 page.

Shin-Hung Chang et al., "SGA: A Sporadic GDI Adapter for Smooth Motion Recording on Computer Screen" (Abstract), published in: Embedded and Ubiquitous Computing (EUC), 2011 IFIP $9^{th}$ International Conference on Oct. 24-26, 2011, retrieved from: <http://ieeexplore.ieee.org/xpl/articleDetails.jsp?tp=&arnumber=6104537>, Aug. 20, 2014, 2 pages.

T. Sasaki et al., "An Exploratory Study on the Impact of Usage of Screenshot in Software Inspection Recording Activity", Published in: Software Measurement, 2011 Joint Conference of the $21^{st}$ Int'l Workshop on and $6^{th}$ Int'l Conference on Software Process and Product Measurement (IWSM-MENSURA) on Nov. 3-4, 2011, retrieved from: <http://ieeexplore.ieee.org/xpl/articleDetails.jsp?tp=&arnumber=6113068>, Aug. 20, 2014, 2 pages.

J.J. Schultz et al., "An efficient scheme for chaining with client-centric buffer reservation for multi-media streaming", Published in: Simulation Symposium, 2003, $36^{th}$ Annual: Date of Conference: Mar. 30-Apr. 2, 2003, retrieved from <http://ieeexplore.ieee.org/xpl/articleDetailsjsp?tp=&arnumber=1192795>, Aug. 20, 2014, 2 pages.

Cybele Software, ThinRDP, © 2011-2014 by Cybele Software Inc., retrieved from: <http://www.cybelesoft.com/thinrdp/>, Aug. 20, 2014, 2 pages.

Observeit, ObserveIT Enterprise for User Activity Monitoring: Get Compliant with Citrix, SSH and RDP Recording, retrieved from <http://www.observeit.com/Products>, Aug. 20, 2014, 2 pages.

ObserveIt, Record and Replay Windows Sessions, retrieved from <http://www.observeit.com/Products/Features/Windows>, Aug. 20, 2014, 2 pages.

ObserveIt, Video Activity Analysis of Every Recorded Session, retrieved from <http://www.observeit.com/Products/FeaturesNideo-Activity-Analysis>, Aug. 20, 2014, 2 pages.

Wallix Adminbastion (WAB), retrieved from <http://www.wallix.com/images/Plaquettes/datasheetwabV4EN.pdf>, Aug. 21, 2014, 4 pages.

Remotespark, HTML5 Solution—one ultimate solution for all OS and devices, retrieved from <http://www.remotespark.com/html5.html>, Aug. 21, 2014, 4 pages.

Cyberark, Ensure the controls are in place to centrally secure, manage and monitor privileged accounts, retrieved from <http://www.cyberark.com/solution-detail/control-and-accountability-privileged-users-solutions#.U8ipXuOSyGM>, Aug. 21, 2014, 5 pages.

Cyberark, Control & monitor "who" can initiate and "what" can be done in privileged sessions, retrieved from <http://www.cyberark.com/solution-detail/monitor-record-privileged-activity-solutions#.U8ipxOOSyGM >, Aug. 21, 2014, 4 pages.

Cyberark, Ensure that remote access is secure, controlled and monitored, retrieved from <http://www.cyberark.com/solution-detail/remote-access-control-solutions#.U8iyOeOSyGM>, Aug. 21, 2014, 4 pages.

Hitachi ID Systems, Inc., Hitachi ID Privileged Access Manager, © Hitachi ID Systems, Inc. 2014, retrieved from <http://hitachi-id.com/privileged-access-manager/>, Aug. 21, 2014, 1 page.

Hitachi ID Systems, Inc., Hitachi ID Privileged Access Manager, © Hitachi ID Systems, Inc. 2014, retrieved from <http://hitachi-id.com/privileged-access-manager/overview/>, Aug. 21, 2014, 2 pages.

Hitachi ID Systems, Inc., Hitachi ID Privileged Access Manager, © Hitachi ID Systems, Inc. 2014, retrieved from <http://hitachi-id.com/privileged-access-manager/overview/screen-recordings.html>, Aug. 21, 2014, 3 pages.

Ericom, PowerTerm WebConnect RemoteView, Copyright © 2014 Ericom® Software, retrieved from <http://www.ericom.com/webconnect_remoteview_features.asp>, Aug. 21, 2014, 2 pages.

ObserveIt, Customizable Recording Policies, retrieved from <http://www.observeit.com/Products/Features/Customizable-Recording-Policies>, Aug. 21, 2014, 2 pages.

ObserveIt, How ObserveIT Works: Monitoring TS, Citrix, Vmware and SSH session, retrieved from <http://www.observeit.com/Products/How_It_Works>, Aug. 21, 2014, 2 pages.

ObserveIt, Database Management, retrieved from <http://www.observeit.com/Products/Features/Database_Management>, Aug. 21, 2014, 2 pages.

ObserveIt, Threat Detection Console, retrieved from <http://www.observeit.com/Products/Features/Threat-Detection-Console>, Aug. 21, 2014, 2 pages.

ObserveIt, Advanced Keylogging Capabilities, retrieved from <http://www.observeit.com/Products/Features/Advanced-Keylogging-Capabilities>, Aug. 21, 2014, 2 pages.

ObserveIt, ObserveIT User Session Auditor Feature List, retrieved from <http://www.observeit.com/Products/Features>, Aug. 21, 2014, 4 pages.

ObserveIt, Privileged User Identification, retrieved from <http://www.observeit.com/Products/Features/Privileged_User_Identification>, Aug. 21, 2014, 2 pages.

ObserveIt, Product Integrations, retrieved from <http://www.observeit.com/Products/Integrations>, Aug. 21, 2014, 2 pages.

ObserveIt, Architecture, retrieved from <http://www.observeit.com/Products/Architecture>, Aug. 21, 2014, 2 pages.

ObserveIt, Version Comparison User Auditing Options, retrieved from <http://www.observeit.com/Products/Versions>, Aug. 26, 2014, 1 page.

ObserveIt, Managing ObserveIT Storage, retrieved from <http://www.observeit.com/products/documentation/index.htm>, Sep. 5, 2014, 2 pages.

ObserveIt, Recording Metadata Information, retrieved from <http://www.observeit.com/products/documentation/index.htm>, Sep. 5, 2014, 3 pages.

ObserveIt, Recording User Sessions, retrieved from <http://www.observeit.com/products/documentation/index.htm>, Sep. 5, 2014, 2 pages.

ObserveIt, Replaying User Sessions, retrieved from <http://www.observeit.com/products/documentation/index.htm>, Sep. 5, 2014, 2 pages.

ObserveIt, Server Diary, retreived from <http://www.observeit.com/products/documentation/index.htm>, Sep. 5, 2014, 6 pages.

ObserveIt, Web Management Console, retrieved from <http://www.observeit.com/products/documentation/index.htm>, Sep. 5, 2014, 4 pages.

* cited by examiner

SYSTEM AND METHOD FOR OPTIMIZING VISUAL SESSION RECORDING FOR USER ACCOUNT MANAGEMENT IN A COMPUTING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. Patent Application titled "SYSTEM AND METHOD FOR USING POLICIES TO SUPPORT SESSION RECORDING FOR USER ACCOUNT MANAGEMENT IN A COMPUTING ENVIRONMENT", application Ser. No. 14/494,732, filed Sep. 24, 2014 ;

U.S. Patent Application titled "SYSTEM AND METHOD FOR SUPPORTING DYNAMIC OFFLOADING OF VIDEO PROCESSING FOR USER ACCOUNT MANAGEMENT IN A COMPUTING ENVIRONMENT", application Ser. No. 14/494,737, filed Sep. 24, 2014 ; and U.S. Patent Application titled "SYSTEM AND METHOD FOR SUPPORTING VIDEO PROCESSING LOAD BALANCING FOR USER ACCOUNT MANAGEMENT IN A COMPUTING ENVIRONMENT", application Ser. No. 14/494,738, filed Sep. 24, 2014 .

FIELD OF INVENTION

The present invention is generally related to computer systems, and is particularly related to user account management in a computing environment.

BACKGROUND

As the enterprise/cloud applications and systems become more complex, the task of preventing inappropriate access to various user accounts and the task of detecting unauthorized activities by many different users become extremely challenging. This is the general area that embodiments of the invention are intended to address.

SUMMARY

Described herein are systems and methods that can monitor one or more user sessions on a target system in a computing environment. An account managing system can capture a plurality of user session screen captures that are associated with said one or more user sessions on the target system. Furthermore, the account managing system can compare a user session screen capture, which is captured at a time during said one or more user sessions, with one or more user session screen captures that are recorded before the time. Then, the account managing system can record said user session screen capture if the target system is determined to be active at the time when said user session screen capture is captured.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Oracle Privileged Account Manager (OPAM) system as an example for an account management system. It will be apparent to those skilled in the art that other types of account management system can be used without limitation.

Described herein are systems and methods that can support user session management in a computing environment.

Privileged Account Manager

Figure 1:
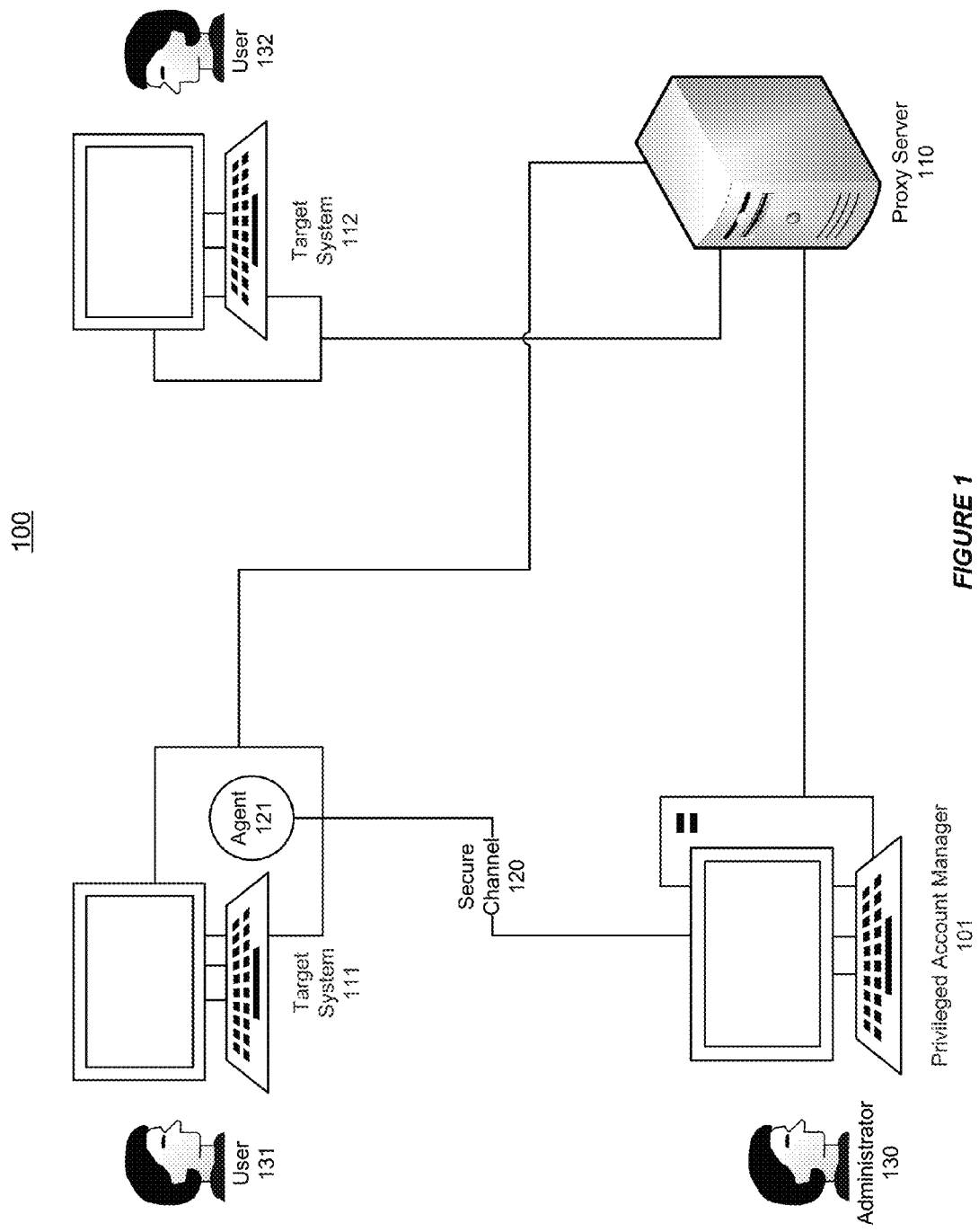
FIG. 1 shows an illustration of an account management system in a computing environment, in accordance with an embodiment of the invention.

FIG. 1 shows an illustration of an account management system in a computing environment, in accordance with an embodiment of the invention. As shown in FIG. 1, an account manager, such as a privileged account manager 101, can monitor and record user sessions (e.g. by users 131-132) on one or more target systems 111-112 in a computing environment 100.

The privileged account manager 101, e.g. an Oracle Privileged Account Manager (OPAM), is a server that is capable of managing privileged accounts and user sessions on the target systems 111-112. The privileged account, such as a root account in a UNIX system or a system account in a database system, can be shared by multiple users 131-132 and can also be role-based.

The target systems 111-112 are the remote targets, which have privileged accounts managed by the privileged account manager 101. The privileged account manager 101 can manage different types of user sessions on the target systems 111-112. For example, these user sessions can include Microsoft Windows sessions, Linux X11 sessions, virtual network computing (VNC) sessions, and Mac OS X remote desktop sessions.

As shown in FIG. 1, an agent 121 can be deployed on a target system 111 for monitoring one or more user sessions on the target system 111. The agent 121 can record user activities within a user session and communicates with the privileged account manager 101 (e.g. for obtaining screen comparison rules and sending back recorded data).

In accordance with an embodiment of the invention, the agent 121 can be physically deployed on the target system 111. The agent 121 can subscribe to a graphical user interface (GUI) rendering system, such as the windowing system, on the target system 111 to obtain various application GUI state information, such as the title of the window for the active application in the foreground. Furthermore, the agent 121 can communicate with the privileged account manager 101 using a secure channel 120, e.g. based on the secure shell (SSH)/transport layer security (TLS) protocols.

Alternatively, the privileged account manager 101 can take advantage of a proxy server 110, which can monitor and record user sessions on the target systems 111-112. For example, the proxy server 110 can be used to collect session information on the different target systems 111-112, such as textual information (e.g. the commands and key strokes) and visual information (e.g. the graphical display and windows).

In accordance with an embodiment of the invention, the use of the proxy server 110 can be beneficial, in terms of alleviating the life-cycle burden in maintaining different versions of the same software on a large number of servers, devices, and platforms, since the proxy server 110 does not rely on the agent 121 that is deployed physically on a target system 111.

On the other hand, the agent 121 and the proxy server 110 can monitor said one or more user sessions on the target system simultaneously. As shown in FIG. 1, the agent 121 can be deployed on a sensitive system (e.g. the target system 111), which is also monitored by the proxy server 110. Since the agent 121 is physically deployed on the target system 111, the agent 121 can closely monitor the different user actives and collect more information than the proxy server 110.

Then, an administrator 130 can connect to the privileged account manager 101 and perform various management tasks, such as view, search and audit the recorded sessions, in order to prevent inappropriate access to various account and to detect unauthorized activities.

Figure 2:
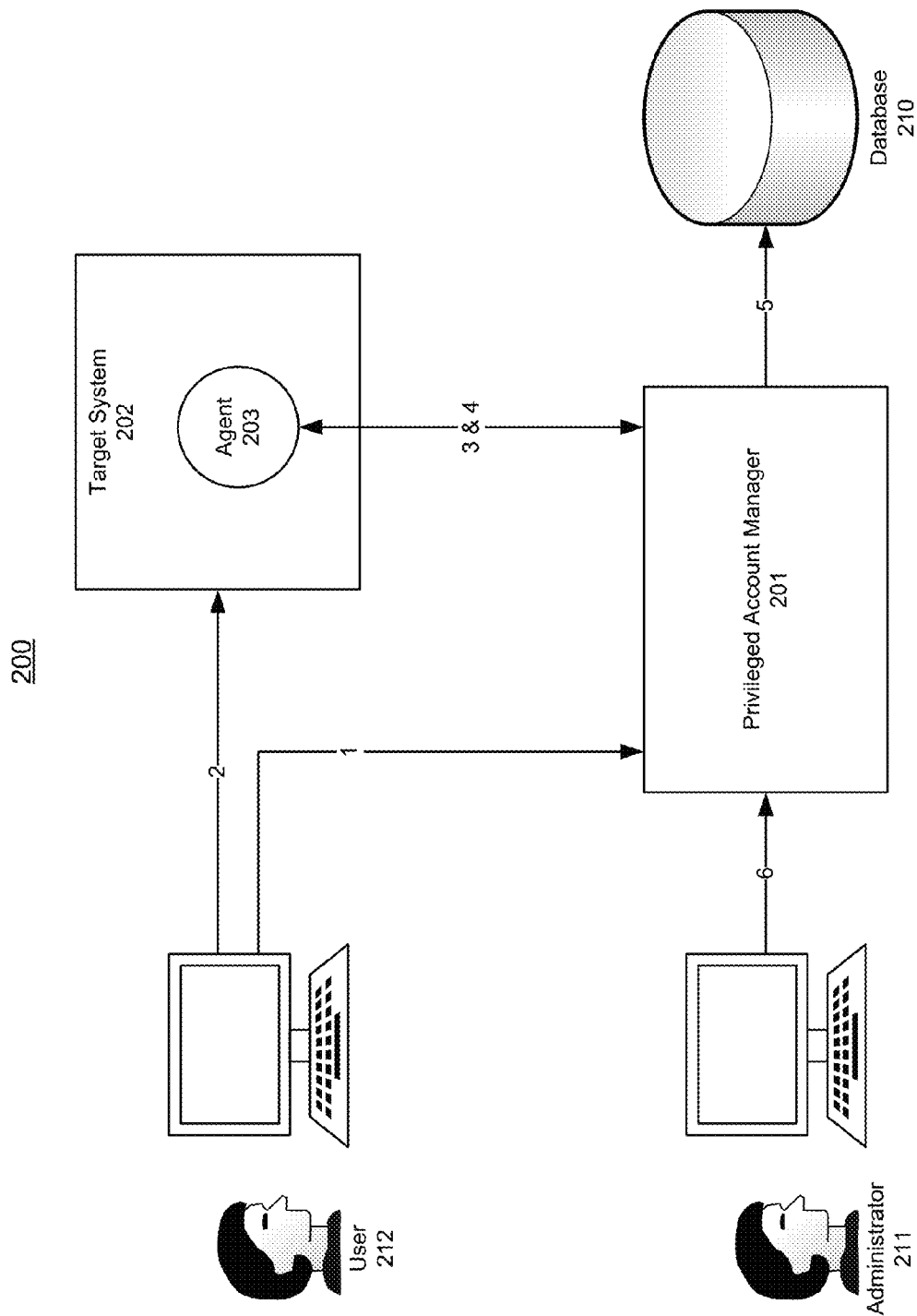
FIG. 2 shows an illustration of supporting user session monitoring in a computing environment, in accordance with an embodiment of the invention.

FIG. 2 shows an illustration of supporting user session monitoring in a computing environment, in accordance with an embodiment of the invention. As shown in FIG. 2, a privileged account manager 201, e.g. an Oracle the Oracle Privileged Account Manager (OPAM), can be used for monitoring user sessions on a target system 202.

At step 1, a user 212 can connect to the privileged account manager 201 (i.e. the server) and can send a request to the privileged account manager 201 for obtaining an access to a privileged account on the target system 202.

Upon receiving a request for accessing a privileged account from the user 201, the privileged account manager 201 can provide the user 212 with a password or a session. Then, the user 212 can access the privileged account based on the received one-time passwords or direct sessions. For example, the user 212 can obtain a session with graphical interface.

At step 2, the user 212 can connect to the target system 202 to establish a session after obtaining access to the privileged account. A user session may start as soon as a user 212 logs into the privileged account on the target system 202, using the password or session provided by the privileged account manager 201.

Additionally, the access to the privileged account may not be available after the user 212 logs out from the privileged account on the target system 202. The user session may end as soon as the user 212 logs out from the privileged account, at which time the user 212 relinquish its right to access the privileged account and another user is allowed to log in the privileged account.

At step 3, the agent 203 running on the target system 202, after detecting the establishment of a user session, can communicate with privileged account manager 201 to obtain different policies or configurations, such as the screen comparison rules.

The agent 203 can capture and record various screens on the target system 202 based on the screen comparison rules.

At step 4, the agent 203 can send the recorded data back to the privileged account manager 201 for storage.

At step 5, the privileged account manager 201 can store the recorded data in a database 210. For example, the database 210 can be an OPAM Database, which can be used for storing target information, user grants, policies and session recording data.

At step 6, the administrator 211 can connect to the privileged account manager 201 in order to view the recorded and/or ongoing sessions. The administrator 211 can review the recorded sessions, which are the completed user sessions after the user has already logged off. Also, the administrator 211 can review an ongoing session when a user is still using the session. In the case of reviewing an ongoing session, the administrator 211 may view the recording (in real time) as the session is ongoing in a fashion similar to a live record-replay (a.k.a. over the shoulder monitoring).

Visual Session Recording

Figure 3:
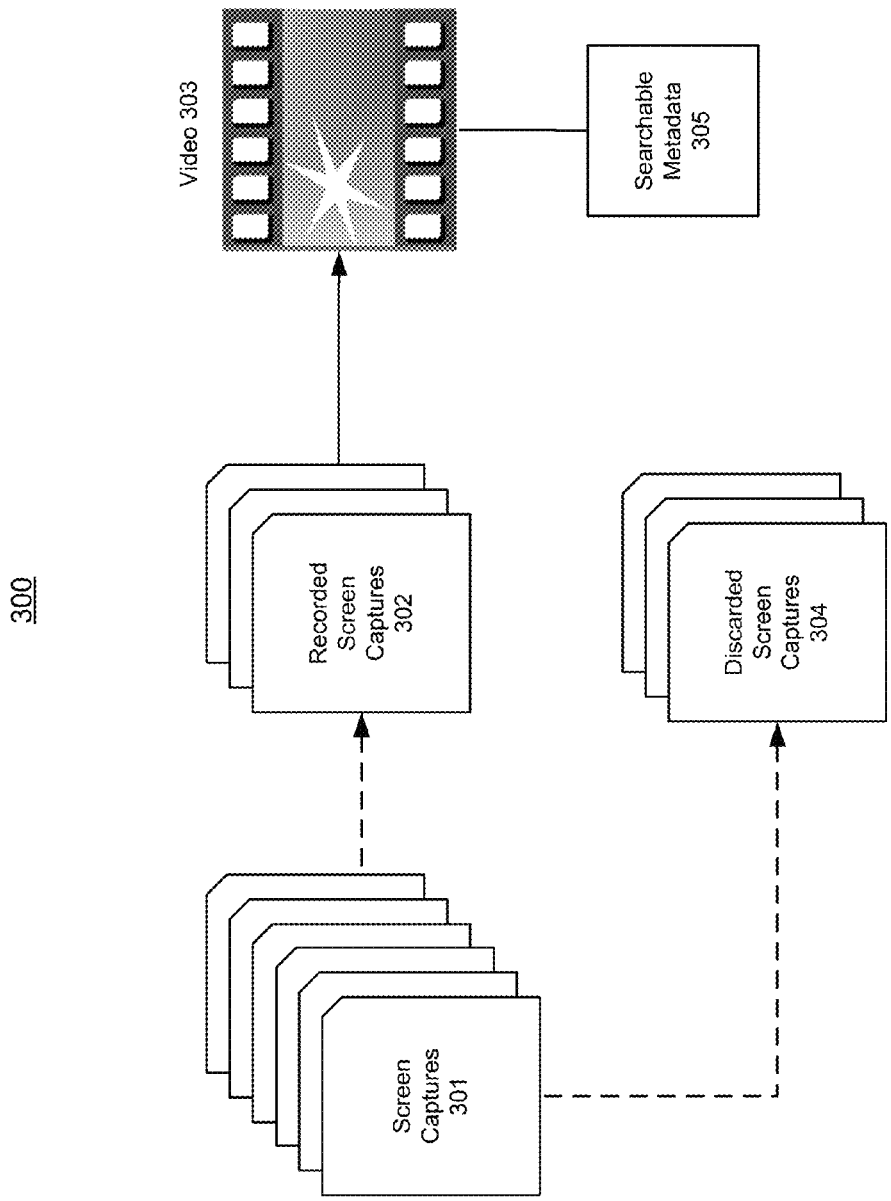
FIG. 3 shows an illustration of supporting visual session recording in a computing environment, in accordance with an embodiment of the invention.

FIG. 3 shows an illustration of supporting visual session recording in a computing environment, in accordance with an embodiment of the invention. As shown in FIG. 3, an account management system 300 can capture a number of screen captures 301 (e.g. screen shots or snapshots) on a target system, e.g. using an agent on the target system or a proxy server, during a user session.

In accordance with an embodiment of the invention, the account management system 300 can record a subset of the screen captures 301, which includes only screen captures 302 that represent significant changes during the user session, discarding the screen captures 304 that are captured when the target system is considered idle.

Thus, the account management system 300 can optimize the usage of processors, storage and network bandwidth.

Furthermore, the account management system 300 can encode the screen captures 302, which are recorded and uncompressed images, into a video 303 and stores the video 303 in a database, such as the OPAM database. The video 303 can be played back later in a fashion similar to a DVR.

Additionally, searchable textual metadata 305, which includes information about the activities, can also be recorded and provided along with the video 303. Thus, an administrator of the account management system 300 can search through the collection of recordings (e.g. the video 303) to look for activities, such as sessions which ran Internet Explorer, Control Panel etc. This provides means to monitor, audit and perform forensic analysis on the target system.

Figure 4:
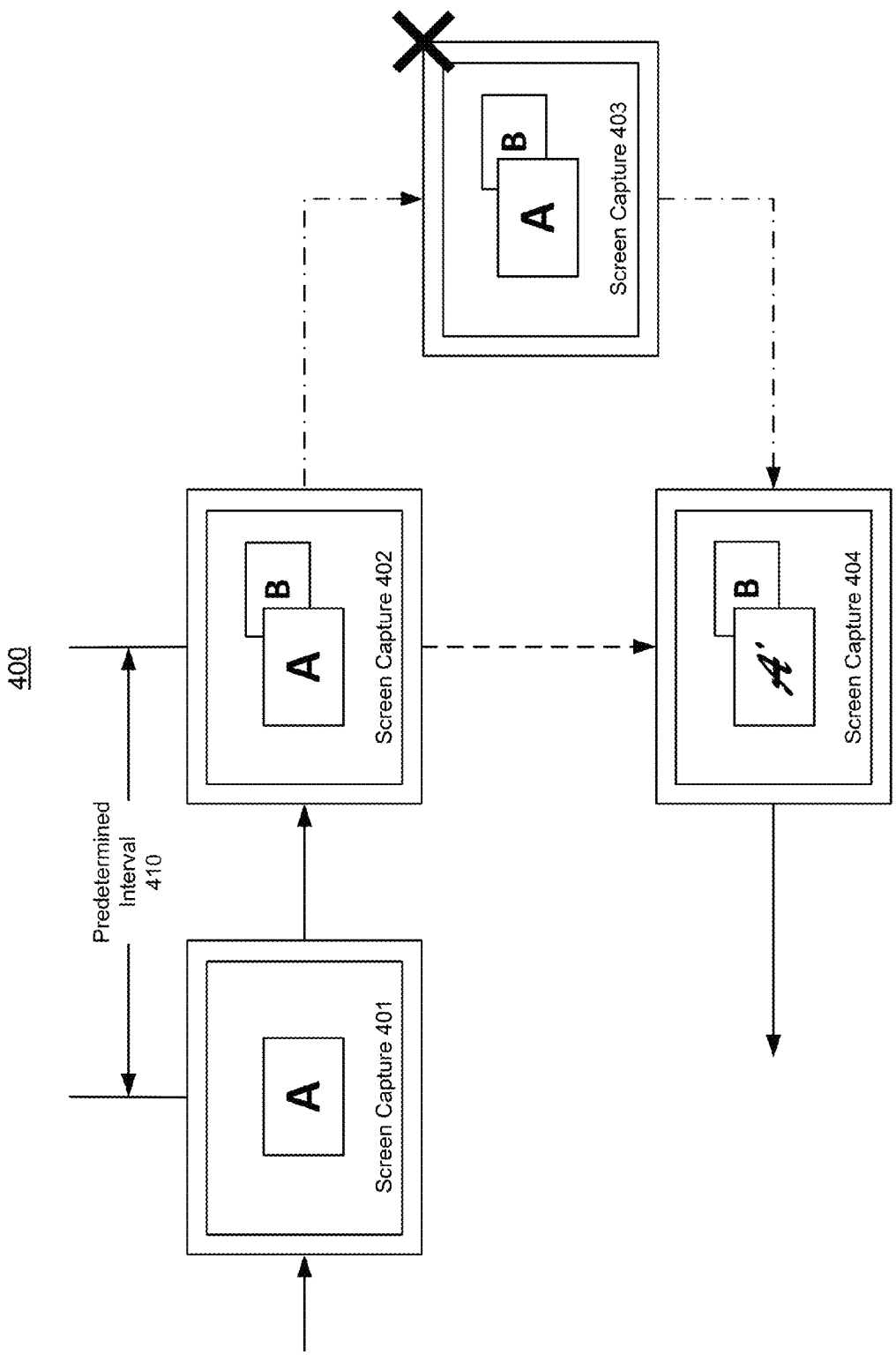
FIG. 4 shows an illustration of supporting screen comparison for visual session recording in a computing environment, in accordance with an embodiment of the invention.

FIG. 4 shows an illustration of supporting screen comparison for visual session recording in a computing environment, in accordance with an embodiment of the invention. As shown in FIG. 4, an account management system 400, e.g. the OPAM system, can capture a number of screen captures 401-404 on a target system during a user session.

For example, the account management system 400 can capture a screen capture 401, which includes a graphic user interface (GUI) item A. Then, the account management system 400 can capture a screen capture 402 and a screen capture 403. Both the captured screen capture 402 and the captured screen shot 403 can include a GUI item A and a GUI item B. Additionally, the account management system 400 can capture a screen capture 404, which includes a changed GUI item A' and the GUI item B, which is identical to the GUI item B on the captured screen captures 402-403.

As shown in FIG. 4, the account management system 400 can capture session screens on the target system at a predetermined interval 410 (e.g. by taking snapshots of the screen every 100 milliseconds).

In accordance with an embodiment of the invention, the account management system 400 can support visual session recording with a dynamically configurable snapshot frequency. For example, the predetermined interval 410 can be tuned based on the nature of the user activity. The account management system 400 can decrease the snapshot frequency (i.e. increase the predetermined interval 410) for a less critical system to reduce the usage of processor, storage and network resources without significantly compromising the auditability. On the other hand, the account management system 400 can increase the snapshot frequency (i.e. decrease the predetermined interval 410) for a more critical system to improve auditability.

In accordance with an embodiment of the invention, the account management system 400 can support visual session recording by dropping (i.e. not storing) identical screen captures. The account management system 400 can compare a screen capture 403 with a previously recorded screen capture 402 to determine whether the target system is idle.

For example, a mathematical hash can be computed and used for the preliminary screen captures comparison. The account management system 400 can compute a hash for the screen capture 403. Then, the account management system 400 can compare the computed hash for the screen capture 403 with a recorded hash for the previously recorded screen capture 402. If the hashes are identical, then the target system is considered to be idle and the captured screen capture 403 may be dropped.

In accordance with an embodiment of the invention, the account management system 400 can keep the screen captures with meaningful visual changes. The account management system 400 may decide to discard other images, which may contain certain visual changes that are not considered meaningful. This helps in further reducing the number of screen captures that may need to be encoded into a video.

As shown in FIG. 4, there are visual differences between the screen capture 404 and the previously recorded screen capture 402 (e.g. the GUI item A' is different from the GUI item A). Thus, the account management system 400 can decide to record (i.e. keep) the screen capture 404, since the target system is considered active.

In accordance with an embodiment of the invention, the account management system 400 can support visual session recording using intelligent snapshot comparison. If the screen capture is not identical, the account management system 400 can use a set of screen capture comparison rules to determine whether the visual change is meaningful or not.

The account management system 400 can consider any visual change in the areas of the screen display, such as the Date & Time, Weather Widget, to be irrelevant. The account management system 400 can ignore such differences. For example, by ignoring the screen changes that only involve a ticking clock on the task bar, which may not add useful information for auditability, the account management system 400 can optimize the resource usage in a significant fashion.

Additionally, the account management system 400 can use only the active foreground applications, instead of the entire screen, for comparison. Any screen change outside the foreground application may be ignored. For example, a video running in the background on an inactive browser window may not be considered as relevant from the view point of an auditor.

Furthermore, the account management system 400 may consider only the visual changes in windows belonging to selective applications. Any screen change outside the applications of interest may be ignored. For example, the account management system 400 can subscribe to a graphical user interface (GUI) rendering system, such as the windowing system on the target system, to obtain various application GUI state information, such as the title of the window for a selective application, such as the active application in the foreground.

Figure 5:
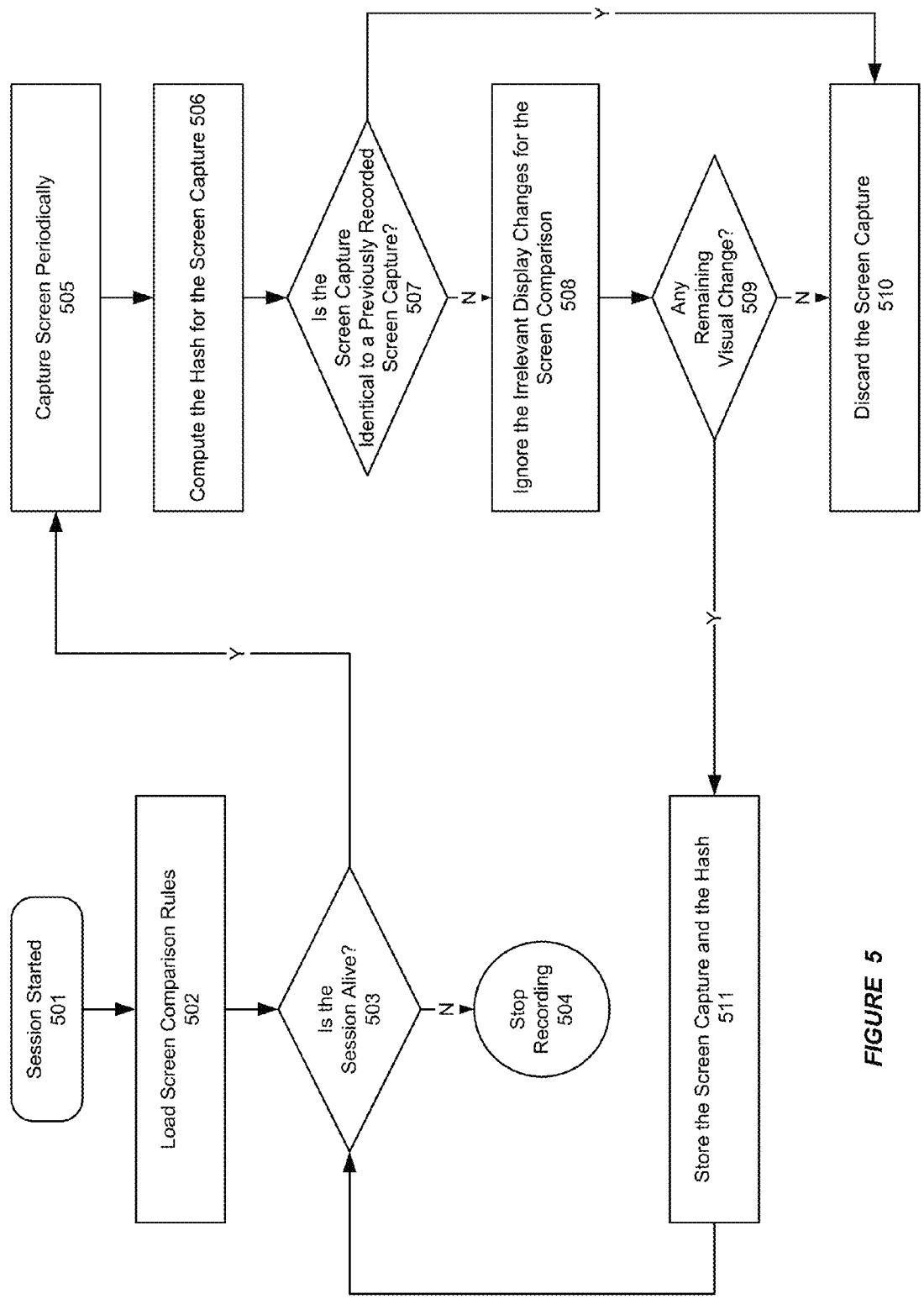
FIG. 5 shows an illustration of supporting an exemplary visual session recording process in a computing environment, in accordance with an embodiment of the invention.

FIG. 5 shows an illustration of supporting an exemplary visual session recording process in a computing environment, in accordance with an embodiment of the invention. As shown in FIG. 5, At step 501, a visual session recording process, such as an agent on a target system or a proxy server, can detect the start (or establishment) of a user session, e.g. when a user first logs into a privileged account.

Then, at step 502, the visual session recording process can load screen comparison rules, e.g. from a privileged account manager server.

At step 503, the visual session recording process can check whether the user session is still alive. At step 504, the visual session recording process can stop the visual session recording if the session is not alive. Otherwise, at step 505, the visual session recording process can capture the user session screen on the target system periodically. For example, an agent can make a screen capture every one hundred (100) milliseconds.

Furthermore, at step 506, the visual session recording process can compute a hash for the screen capture. Then, at step 507, the visual session recording process can determine whether the screen capture is identical to a previously recorded screen capture by comparing the computed hash with a stored hash for the preciously recorded screen capture.

If the visual session recording process determines that the screen capture is identical to a previously recorded screen capture, at step 510, the visual session recording process can discard the screen capture.

Otherwise, if the screen capture is not identical to a previously recorded screen capture, at step 508, the visual session recording process can ignore any irrelevant display changes in the screen capture for the screen capture comparison. Then, at step 509, the visual session recording process can check whether there are any remaining visual changes.

If the visual session recording process determines that there are no remaining visual changes, at step 510, the system can discard the screen capture. Otherwise, at step 511, the visual session recording process can store the screen capture for display. Also, the visual session recording process can store the computed hash for the captured screen, so that the stored hash can be used for quickly determining whether a later screen capture is identical to the stored screen capture.

Figure 6:
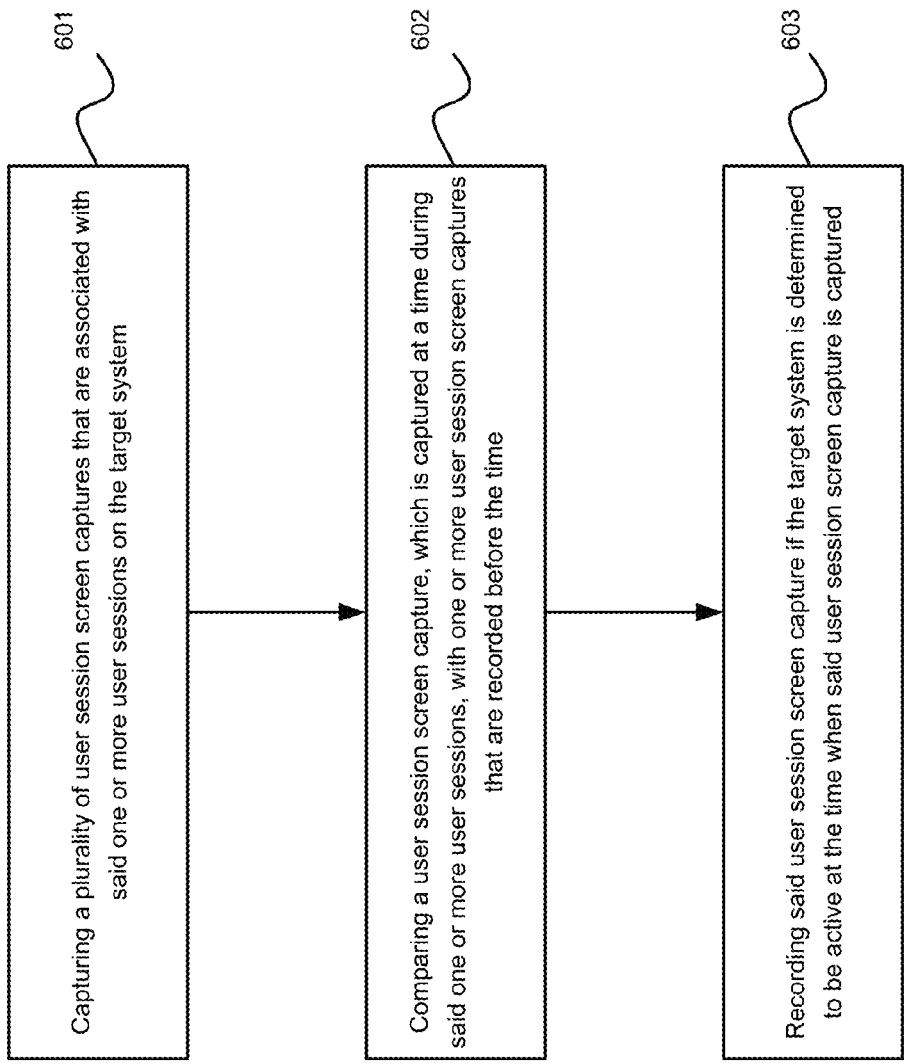
FIG. 6 illustrates an exemplary flow chart for supporting visual session recording in a computing environment, in accordance with an embodiment of the invention.

FIG. 6 illustrates an exemplary flow chart for supporting visual session recording in a computing environment, in accordance with an embodiment of the invention. As shown in FIG. 6, at step 601, the account managing system operates to capture a plurality of user session screen captures that are associated with said one or more user sessions on the target system. Furthermore, at step 602, the account managing system can compare a user session screen capture, which is captured at a time during said one or more user sessions, with one or more user session screen captures that are recorded before the time. Then, at step 603, the account managing system can record (and store) said user session screen capture if the target system is determined to be active at the time when said user session screen capture is captured.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for monitoring user sessions on a target system in a computing environment, comprising:
   providing an account management system;
   automatically capturing with the account management system a plurality of user session screen captures that are associated with a user session on the target system at an interval;
   tuning the interval dynamically based on an activity in said user session;
   using the account management system to process each user session screen capture of said plurality of user session screen captures by,
      computing a hash for the user session screen capture,
      comparing the hash computed for the user session screen capture, which is captured at a time during said user session, with a hash that was computed for a user session screen capture that was recorded before the time and discarding said user session screen capture if the hash computed for the user session screen capture is identical to said hash that was computed for said user session screen capture that was recorded before the time, and
      applying one or more screen capture comparison rules and discarding said user session screen capture if differences identified between the user session screen capture and said user session screen capture that was recorded before the time do not satisfy at least one of said one or more screen capture comparison rules; and
   using the account management system to automatically encode into a video a subset of the plurality of recorded user session screen captures said subset comprising those user session screen captures which were not discarded.

2. The method according to claim 1, further comprising:
   providing an agent deployed on the target system as part of said account management system; and
   using said agent to monitor said one or more user sessions on the target system, wherein the agent operates to communicate with a privileged account manager server using a secure channel.

3. The method according to claim 1, further comprising:
   providing a proxy server that is associated with a privileged account manager server as part of said account management system; and
   using said proxy server to monitor said one or more user sessions on the target system, wherein the proxy server operates to monitor a plurality of user sessions on a plurality of target systems independently.

4. The method according to claim 1, further comprising:
   providing an agent deployed on the target system as part of said account management system;
   providing a proxy server that is associated with a privileged account manager server as part of said account management system;
   using simultaneously said agent and said proxy server to monitor said one or more user sessions on the target system.

5. The method according to claim 1, wherein:
   automatically capturing with the account management system a plurality of user session screen captures that are associated with said user session on the target system comprises automatically capturing the plurality of user session screen captures associated with said user session on the target system at a predetermined interval.

6. The method according to claim 1, wherein:
   tuning the interval dynamically based on an activity in said user session comprises increasing the interval if the activity is not critical and reducing the interval if the activity is critical.

7. The method according to claim 1, further comprising:
   allowing a user to
      connect to a privileged account manager server,
      get access to a privileged account on the target system, and
      establish a user session.

8. The method according to claim 1, further comprising:
   providing an agent deployed on the target system as part of said account management system; and
   detecting, via said agent, an establishment of a user session on the target system.

9. The method according to claim 1, further comprising:
   communicating with a privileged account manager server to obtain said one or more screen capture comparison rules.

10. The method according to claim 1, wherein applying one or more screen capture comparison rules and discarding said user session screen capture if differences identified between the user session screen capture and said user session screen capture that was recorded before the time do not satisfy at least one of said one or more screen capture comparison rules comprises:
    applying a screen capture comparison rule which requires said differences be in an active foreground application and discarding said user session screen capture if said differences identified between the user session screen capture and said user session screen capture that was recorded before the time are not for an active foreground application.

11. The method according to claim 1, wherein applying one or more screen capture comparison rules and discarding said user session screen capture if differences identified between the user session screen capture and said user session screen capture that was recorded before the time do not satisfy at least one of said one or more screen capture comparison rules comprises:
applying a screen capture comparison rule which requires said differences be in a selected application and discarding said user session screen capture if said differences identified between the user session screen capture and said user session screen capture that was recorded before the time are not in the selected application.

12. The method according to claim 1, wherein applying one or more screen capture comparison rules and discarding said user session screen capture if differences identified between the user session screen capture and said user session screen capture that was recorded before the time do not satisfy at least one of said one or more screen capture comparison rules comprises:
applying a screen capture comparison rule which requires said differences be relevant to auditing of said user session and discarding said user session screen capture if said differences identified between the user session screen capture and said user session screen capture that was recorded before the time are not relevant to auditing said user session.

13. The method according to claim 1, further comprising:
automatically associating said video with a searchable metadata; and
storing said video in a database.

14. The method according to claim 1, further comprising:
allowing an administrator to view the video for monitoring said user session.

15. A system for monitoring user sessions on a target system in a computing environment, comprising:
a computer system comprising one or more microprocessors and a memory;
an account management system, running on said computer system, wherein said account management system is configured to automatically capture a plurality of user session screen captures that are associated with a user session on the target system at an interval;
wherein the account management system tunes the interval dynamically based on an activity in said user session;
wherein the account management system is further configured to process each user session screen capture of said plurality of user session screen captures by,
computing a hash for the user session screen capture,
comparing the hash computed for the user session screen capture, which is captured at a time during said user session, with a hash that was computed for a user session screen capture that was recorded before the time and discarding said user session screen capture if the hash computed for the user session screen capture is identical to said hash that was computed for said user session screen capture that was recorded before the time, and
applying one or more screen capture comparison rules and discarding said user session screen capture if differences identified between the user session screen capture and said user session screen capture that was recorded before the time do not satisfy at least one of said one or more screen capture comparison rules; and
wherein the account management system is further configured to automatically encode into a video a subset of the plurality of recorded user session screen captures said subset comprising those user session screen captures which were not discarded.

16. The system according to claim 15, wherein:
the account management system comprises an agent that is deployed on the target system to monitor said one or more user sessions on the target system, wherein the agent is configured to communicate with a privileged account manager server using a secure channel.

17. The system according to claim 15, wherein:
the account management system comprises a proxy server that is associated with a privileged account manager server and which monitors said one or more user sessions on the target system, wherein the proxy server operates to monitor a plurality of user sessions on a plurality of target systems independently.

18. The system according to claim 15, wherein:
the account management system comprises an agent that is deployed on the target system and a proxy server that is associated with a privileged account manager server; and
wherein the account management system uses the agent and the proxy server simultaneously to monitor said one or more user sessions on the target system.

19. The system according to claim 15, wherein:
said account management system operates to automatically capture the plurality of user session screen captures associated with said user session on the target system at a predetermined interval.

20. The system according to claim 15, wherein:
said account management system dynamically tunes the interval based on an activity in said user session by increasing the interval if the activity is not critical and reducing the interval if the activity is critical.

21. The system according to claim 15, wherein:
said account management system is configured to enable a user to
connect to a privileged account manager server,
get access to a privileged account on the target system, and
establish a user session.

22. The system according to claim 15, wherein:
the account management system comprises an agent on the target system wherein the agent is configured to detect an establishment of a user session on the target system.

23. The system according to claim 15, wherein:
the account management system comprises an agent on the target system wherein the agent is configured to communicate with a privileged account manager server to obtain said one or more screen capture comparison rules.

24. The system according to claim 15, wherein applying one or more screen capture comparison rules and discarding said user session screen capture if differences identified between the user session screen capture and said user session screen capture that was recorded before the time do not satisfy at least one of said one or more screen capture comparison rules comprises:
applying a screen capture comparison rule which requires said differences be in an active foreground application and discarding said user session screen capture if said differences identified between the user session screen capture and said user session screen capture that was recorded before the time are not for an active foreground application.

25. The system according to claim 15, wherein applying one or more screen capture comparison rules and discarding said user session screen capture if differences identified between the user session screen capture and said user session screen capture that was recorded before the time do not satisfy at least one of said one or more screen capture comparison rules comprises:

applying a screen capture comparison rule which requires said differences be in a selected application and discarding said user session screen capture if said differences identified between the user session screen capture and said user session screen capture that was recorded before the time are not in a selected application.

26. The system according to claim 15, wherein applying one or more screen capture comparison rules and discarding said user session screen capture if differences identified between the user session screen capture and said user session screen capture that was recorded before the time do not satisfy at least one of said one or more screen capture comparison rules comprises:

applying a screen capture comparison rule which requires said differences be relevant to auditing of said user session and discarding said user session screen capture if said differences identified between the user session screen capture and said user session screen capture that was recorded before the time are not relevant to auditing of said user session.

27. The system according to claim 15, wherein:

said account management system is configured to associated searchable metadata with said video and store said video in a database accessible to an administrator thereby enabling the administrator to replay the stored video for monitoring said user session.

28. A non-transitory machine readable storage medium having instructions stored thereon for monitoring one or more user sessions on a target system in a computing environment, which instructions, when executed cause a computer system to perform steps comprising:

providing an account management system;

automatically capturing with the account management system a plurality of user session screen captures that are associated with a user session on the target system at an interval;

tuning the interval dynamically based on an activity in said user session;

using the account management system to process each user session screen capture of said plurality of user session screen captures by, computing a hash for the user session screen capture, comparing the hash computed for the user session screen capture, which is captured at a time during said user session, with a hash that was computed for a user session screen capture that was recorded before the time and discarding said user session screen capture if the hash computed for the user session screen capture is identical to said hash that was computed for said user session screen capture that was recorded before the time, and applying one or more screen capture comparison rules and discarding said user session screen capture if differences identified between the user session screen capture and said user session screen capture that was recorded before the time do not satisfy at least one of said one or more screen capture comparison rules; and using the account management system to automatically encode into a video a subset of the plurality of recorded user session screen captures said subset comprising those user session screen captures which were not discarded.

* * * * *

UNITED STATES PATENT AND TRADEMARK OFFICE
CERTIFICATE OF CORRECTION

PATENT NO. : 9,185,175 B1  
APPLICATION NO. : 14/494728  
DATED : November 10, 2015  
INVENTOR(S) : Sharma et al.

Page 1 of 1

It is certified that error appears in the above-identified patent and that said Letters Patent is hereby corrected as shown below:

Title Page, item (56)

On page 2, column 1, under other publications, line 1, delete "Recordts" and insert -- Records --, therefor.

On page 2, column 2, under other publications, line 64, delete "retreived" and insert -- retrieved --, therefor.

In the Specification

In column 1, line 27, delete "Sep. 24, 2014 ;" and insert -- Sep. 24, 2014; --, therefor.

In column 1, line 32, delete "Sep. 24, 2014 ; and" and insert -- Sep. 24, 2014; and --, therefor.

In column 1, line 37, delete "Sep. 24, 2014 ." and insert -- Sep. 24, 2014. --, therefor.

Signed and Sealed this  
Twenty-eighth Day of June, 2016

Michelle K. Lee  
*Director of the United States Patent and Trademark Office*